United States Patent
Al-Dahle et al.

(10) Patent No.: US 10,043,469 B2
(45) Date of Patent: Aug. 7, 2018

(54) INTEGRATED TOUCH SENSOR AND FORCE SENSOR FOR AN ELECTRONIC DEVICE

(71) Applicant: Apple Inc., Cupertino, CA (US)

(72) Inventors: Ahmad Al-Dahle, San Jose, CA (US); Yingxuan Li, Saratoga, CA (US); Marduke Yousefpor, San Jose, CA (US); Weijun Yao, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/708,795

(22) Filed: Sep. 19, 2017

(65) Prior Publication Data

US 2018/0025694 A1    Jan. 25, 2018

Related U.S. Application Data

(63) Continuation of application No. 14/639,406, filed on Mar. 5, 2015, now Pat. No. 9,779,676.

(60) Provisional application No. 62/057,524, filed on Sep. 30, 2014.

(51) Int. Cl.
*G09G 3/36* (2006.01)
*G06F 3/044* (2006.01)
*G06F 3/041* (2006.01)

(52) U.S. Cl.
CPC ........... *G09G 3/3648* (2013.01); *G06F 3/044* (2013.01); *G06F 3/0412* (2013.01); *G06F 2203/04105* (2013.01); *G06F 2203/04106* (2013.01); *G06F 2203/04107* (2013.01); *G09G 2354/00* (2013.01)

(58) Field of Classification Search
CPC ......... G06F 3/044; G06F 3/0414; G01L 1/146
See application file for complete search history.

(56) References Cited

U.S. PATENT DOCUMENTS

| | | |
|---|---|---|
| 7,152,482 B2 | 12/2006 | Ueno et al. |
| 8,144,271 B2 | 3/2012 | Han |
| 8,305,358 B2 | 11/2012 | Klinghult |

(Continued)

FOREIGN PATENT DOCUMENTS

WO    WO 15/077200    5/2015

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — Gerald Johnson
(74) *Attorney, Agent, or Firm* — Brownstein Hyatt Farber Schreck, LLP

(57) ABSTRACT

Systems and method of performing touch and force sensing in an electronic device. The device includes a cover and an array of touch-sensor electrodes disposed below the cover. The first array of electrodes may be configured to sense a touch on the cover using a capacitive sensing scheme. The device also includes a force-sensor drive electrode disposed below the first array of electrodes and a force-sensor sense electrode disposed below the force-sensor drive electrode. The force-sensor drive and sense electrode may be configured to sense a force on the cover. The device also includes a shared drive circuit having an output that is operatively coupled to the array of touch-sensor electrodes and the force-sensor drive electrode.

20 Claims, 8 Drawing Sheets

(56) References Cited

U.S. PATENT DOCUMENTS

| | | |
|---|---|---|
| 8,421,483 B2 | 4/2013 | Klinghult |
| 8,547,495 B2 | 10/2013 | Lee |
| 8,553,004 B2 | 10/2013 | Hotelling et al. |
| 8,560,947 B2 | 10/2013 | Gillespie et al. |
| 8,618,720 B2 | 12/2013 | Paleczny et al. |
| 8,629,841 B2 | 1/2014 | Degner et al. |
| 8,631,567 B2 | 1/2014 | Lee et al. |
| 8,730,199 B2 | 5/2014 | Sleeman et al. |
| 8,743,060 B2 | 6/2014 | Hotelling |
| 8,878,811 B1 | 11/2014 | Baumbach |
| 8,970,507 B2 | 3/2015 | Holbein et al. |
| 8,988,384 B2 | 3/2015 | Krah et al. |
| 9,081,453 B2 | 7/2015 | Bulea et al. |
| 9,116,570 B2 | 8/2015 | Lee et al. |
| 9,232,636 B2 | 1/2016 | Ozeki et al. |
| 9,348,472 B2 | 5/2016 | Kang |
| 9,454,268 B2 | 9/2016 | Badaye et al. |
| 9,519,857 B2 | 12/2016 | Ryhanen et al. |
| 9,612,690 B2 | 4/2017 | Zirkl et al. |
| 9,690,408 B1 | 6/2017 | Krah |
| 9,779,676 B2 | 10/2017 | Al-Dahle et al. |
| 9,891,770 B2 | 2/2018 | Chen et al. |
| 2009/0002199 A1 | 1/2009 | Lainonen et al. |
| 2010/0171900 A1* | 7/2010 | Lee ............... G02B 6/0051 349/58 |
| 2011/0057899 A1* | 3/2011 | Sleeman ............ G01L 1/146 345/174 |
| 2013/0082970 A1 | 4/2013 | Frey et al. |
| 2015/0084909 A1 | 3/2015 | Worfolk et al. |
| 2015/0103038 A1* | 4/2015 | Han ............. G06F 3/044 345/174 |
| 2016/0062497 A1 | 3/2016 | Huppi et al. |
| 2016/0378223 A1 | 12/2016 | Hyuga et al. |
| 2017/0060290 A1 | 3/2017 | Chen et al. |
| 2017/0285810 A1 | 10/2017 | Krah |
| 2017/0336902 A1 | 11/2017 | Smith |

OTHER PUBLICATIONS

Feist, "Samsung snags patent for new pressure sensitive touch-screens," posted on AndroidAuthority.com at URL: http://www.androidauthority.com/samsung-patent-pressure-sensitive-touch-screens-354860, Mar. 7, 2014, 1 page.

Min et al., "Adaptive Touch Sampling for Energy-Efficient Mobile Platforms," Intel Corporation, Hillsboro, OR 97124, 4 pages.

* cited by examiner

INTEGRATED TOUCH SENSOR AND FORCE SENSOR FOR AN ELECTRONIC DEVICE

CROSS REFERENCE TO RELATED APPLICATION

This application is a continuation of U.S. patent application Ser. No. 14/639,406, filed Mar. 5, 2015, and titled "Integrated Touch Sensor and Force Sensor for an Electronic Device," which is a nonprovisional patent application and claims the benefit under 35 U.S.C. § 119(e) of U.S. Provisional Patent Application No. 62/057,524, filed Sep. 30, 2014, and titled "Integrated Touch Sensor and Force Sensor for an Electronic Device," the disclosures of which are hereby incorporated herein by reference in their entirety.

TECHNICAL FIELD

This disclosure generally relates to a user input for an electronic device, and more specifically to sensing touch and force using a combined sensor.

BACKGROUND

Touch input is an increasingly common form of user input on many portable electronic devices. Touch sensors may be combined with a display screen to provide a touch sensitive surface sometimes referred to as a touch screen. As the size of devices becomes smaller, there is a need to further integrate the elements of a touch sensor with the display. However, combining user input with a display may result in electrical noise that may impair the performance of the touch sensor and/or the performance of the display. Embodiments described herein may be applicable for integrating a touch sensor and a force sensor with a display, without some of the drawbacks of some traditional touch screen systems.

SUMMARY

Embodiments described herein are directed to systems and techniques to integrating a touch sensor and a force sensor into the display stack of a device. In some implementations, the touch sensor and the force sensor share a common drive source. In some implementations, a portion of the force sensor may function as an electrical shield for the touch sensor, which may reduce electrical noise and may help isolate the touch sensor from other aspects of the device.

In some example embodiments, the device includes a cover and an array of touch-sensor electrodes disposed below the cover. The first array of electrodes may be configured to sense a touch on the cover using a capacitive sensing scheme. The device also includes a force-sensor drive electrode disposed below the first array of electrodes and a force-sensor sense electrode disposed below the force-sensor drive electrode. The force-sensor drive and sense electrode may be configured to sense a force on the cover. The device also includes a shared drive circuit having an output that is operatively coupled to the array of touch-sensor electrodes and the force-sensor drive electrode. In some embodiments, the shared drive circuit is configured to produce a drive signal that is transmitted to the force-sensor drive electrode and the array of touch-sensor electrodes. The shared drive circuit may be configured to transmit the drive signal to the force-sensor drive electrode and the array of touch-sensor electrodes at substantially the same time.

In some embodiments, the force-sensor electrode is configured to substantially shield the touch sensor. In some embodiments, the force-sensor drive electrode is a single electrode having an area that is approximately the same as an area of the array of touch-sensor electrodes. The single force-sensor drive electrode may substantially shield the array of touch-sensor electrodes from electrical interference produced by components located below the force-sensor drive electrode. In some embodiments, the force-sensor drive electrode is an electrode of an array of drive electrodes having a combined area that is approximately the same as an area of the array of touch-sensor electrodes. The array of drive electrodes may substantially shield the array of touch-sensor electrodes from electrical interference produced by components located below the force-sensor drive electrode.

In some embodiments, the array of touch-sensor electrodes are operatively coupled to touch-sensing circuitry that is configured to detect changes in charge coupling with an object and one or more electrodes of the array of touch-sensor electrodes to sense the touch. In some cases, the touch-sensing circuitry is configured to operate in accordance with a self-capacitance sensing scheme. The touch-sensing circuitry may include a charge amplifier circuit operatively coupled to the array of touch-sensor electrodes.

In some embodiments, the touch sensor is an in-cell touch sensor. For example, in some embodiments, the array of touch-sensor electrodes are disposed over a display element and are used to drive the display. In some cases, the array of touch-sensor electrodes are the Vcom layer of a thin-film transistor (TFT) liquid crystal display (LCD) element.

In some embodiments, the touch sensor includes a two-layer mutually capacitive touch sensor electrodes. For example, the device may include an array of sense electrodes disposed relative to the array of touch-sensor electrode. The array of sense electrodes may be operatively coupled to touch-sensing circuitry that is configured to detect changes in charge coupling between one or more electrodes of the array of sense electrodes and one or more electrodes of the array of touch-sensor electrodes.

In some embodiments, the touch sensor include a two-layer self-capacitive touch sensor electrodes. For example, the device may include a second array of touch-sensor electrodes disposed relative to the array of touch-sensor electrode. The touch-sensor electrodes and the second array of touch-sensor electrodes may be operatively coupled to touch-sensing circuitry that is configured to detect changes in charge coupling between one or more electrodes of the arrays of electrode and an object touching the cover.

In some embodiments, the force sensor is a capacitive gap sensor. For example, the force-sensor drive electrode and the force-sensor sense electrode may be separated by a gap, A force on the cover may cause the gap to decrease. The force-sensor sense electrode may be operatively coupled to force-sensing circuitry that is configured to detect changes in capacitance between the force-sensor drive electrode and the force-sensor sense electrode due to the decrease in the gap. In some cases, the gap includes one or more of: air, a compressible medium, or a combination of air and a compressible medium.

Some example embodiments are directed to a method of performing touch and force sensing on a cover of a device. The method may include transmitting a drive signal to an array of touch-sensor electrodes using a shared drive circuit. The array of touch-sensor electrodes may be disposed below the cover. The drive signal may also be transmitted to a force-sensor drive electrode using the shared drive circuit. The force-sensor drive electrode may be disposed below the first array of electrodes. A response from the array of touch-sensor electrodes may be sensed and a determination if an object is touching the cover may be made based on the sensed response from the array of touch sensor electrodes. A response from a force-sensor sense electrode that is disposed below the force-sensor drive electrode may also be sensed. A force associated with the object touching the cover may be determined based on the sensed response from the force-sensor sense electrode. In some embodiments, transmitting the drive signal to the array of touch-sensor electrodes and transmitting the drive signal to the force-sensor drive electrode is performed at substantially the same time. In some embodiments, a display drive signal is transmitted to a display element of the device at a separate time than the transmitting the drive signal to the array of touch-sensor electrodes and the transmitting the drive signal to the force-sensor drive electrode.

DETAILED DESCRIPTION

Figure 1:
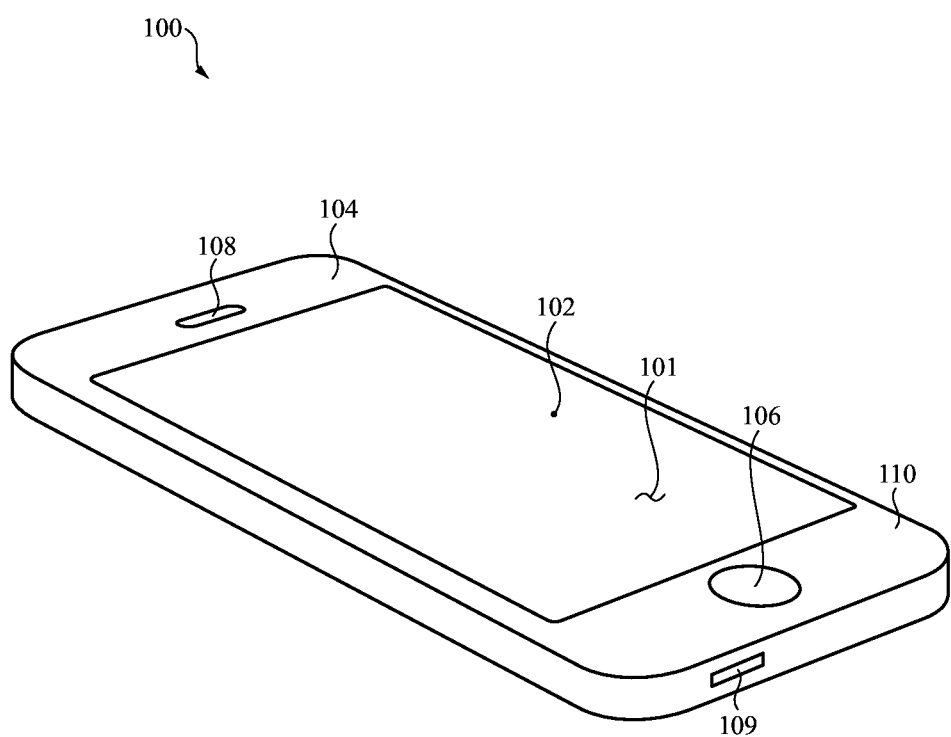
FIG. 1 depicts an example electronic device.

Embodiments described herein are directed to systems and techniques to integrating a touch sensor and a force sensor in an electronic device. In particular, then embodiments described herein are directed to a touch sensor and a force sensor that are integrated into the display stack of a device. In some implementations, the touch sensor and the force sensor share a common drive source. In some implementations, a portion of the force sensor may function as an electrical shield for the touch sensor, which may reduce electrical noise and may help isolate the touch sensor from other aspects of the device.

In some cases, by sharing a common drive, the touch sensor and force sensor may be operated over overlapping time periods without creating substantial cross-talk between the two sensors. This technique may improve the performance of both the touch and force sensor by reducing potential electrical interference between the sensors. Additionally, the operating the touch sensor and force sensor over an overlapping time period may improve the performance of an integrated display element, as compared to some other techniques.

In some embodiments, the touch sensor is a self-capacitive sensor that is disposed below a touch surface of a device. If the touch sensor is incorporated with a display, the touch surface may be the transparent cover or touch glass of the display stack. The touch sensor may be incorporated as a separate sensor layer and/or may be integrated into one or more layers of the display element. In some embodiments described herein, the touch sensor is incorporated into a drive electrode layer of a display element, which may be referred to as an in-cell touch sensor. The self-capacitive touch sensor may be configured to detect a change in capacitance due to the presence of an object, such as the user's finger on the cover glass of the display.

A two-layer capacitive force sensor may be disposed below the touch sensor and at least a portion of the display element. In particular, the force sensor may include a sense layer and a drive layer located between the sense layer of the force sensor and the touch sensor. There may be a gap and/or compressible medium layer between the drive and sense layers of the force sensor. When a force is applied to the surface of the device, the gap or compressible medium layer may compress resulting in a change in capacitance between the drive and sense layers of the force sensor.

In some implementations, the touch sensor and force sensor that are integrated into the same display stack may be driven with a common electrical drive source. By operating the force sensor using the same drive source as the touch sensor, the drive layer of the force sensor may function as an electrical shield, which may isolate the signals produced by the touch sensor from other aspects of the system. Additionally, the drive layer of the force sensor may couple with the touch sensor in a predictable manner, which may also isolate the touch sensor from the effects of mechanical deflection of the display stack with respect to other elements of the device.

In some implementations, the touch sensor and the force sensor may be operated during overlapping time periods. In some cases, the touch sensor and the force sensor may be operated in tandem, which may compress the overall sensing time needed to operate the two sensors. This may be particularly advantageous for in-cell sensing configurations in which the display and touch sensor share electrodes. In some cases, an overlapping sensing period for touch and force sensing may leave more time for display operations, which may improve, or at least not adversely impact, the performance of the display.

Some embodiments may include a mutual-capacitance touch sensor having separate drive and sense layers separated by a gap or dielectric material. A mutual-capacitance touch sensor may be configured to detect a change in the capacitive coupling between the drive and sense layers, which may indicate the presence of an object, such as the user's finger, on a surface of the device. In some cases, one or both of the electrode layers of the mutual-capacitive touch sensor may be shared with one or more electrode layers of the device, which, as discussed above, may be referred to as an in-cell sensor.

Similar to the previous example, a capacitive force sensor may be disposed below the touch sensor. The capacitive force sensor may have a drive layer that is disposed between the sense layer of the force sensor and the drive layer of the mutually capacitive touch sensor. Similar to as described above, the touch and force layers may share a common drive source, which may reduce electrical interference between the sensors and isolate the touch sensor from other elements of the device. Overlapping or tandem operation of the sensors may also facilitate operation of a display element, particularly for in-cell sensor configurations.

Some embodiments described herein are directed to a touch and force sensor incorporated into an electronic device. In particular, the sensor configurations may be incorporated into a wide range of electronic devices, including, for example, a mobile telephone, portable media player, tablet computing device, wearable electronic device, portable health monitoring device, notebook computer, desktop computer, television device, electronic appliance, or other device having a touch user interface. In some embodiments, the sensor configurations may be incorporated into a display device that is installed or incorporated into another device or system. For example, the sensor configurations may be incorporated into a display that is installed in the interior of an automobile, a kiosk, an appliance, or any other product or system having a display.

FIG. 1 depicts a perspective view of an example electronic device 100 that may incorporate a touch and force sensor in accordance with some embodiments. In the present example, the electronic device 100 is a personal electronic device, such as a mobile telephone. As shown in FIG. 1, the device 100 includes a case 110 and a display 101 located within the case 110 and under a cover 102. On the front surface of the device 100 a bezel area 104 surrounds the perimeter of the display 101. The device 100 also includes a button 106 disposed relative to an outer surface of the device 100, in this case, the front surface of the device 100. The device also includes a speaker 108 producing an acoustic output and a microphone 109 for receiving an acoustic input.

In the present example, the display 101 may include one or more of a variety of display elements. For example, the display 101 may include a liquid-crystal display (LCD), an organic light emitting diode display (OLED), light emitting diode (LED) display, organic electroluminescence (OEL) display, or other type of display element. The display 101 may be used to present visual information to the user and may be operated in accordance with one or more display modes or the software applications being executed on the device 100.

The device also includes a cover 102 that helps to protect the display 101 from physical impact or scratches. In some cases, the cover 102 is formed from a sheet or block of transparent material, including glass, sapphire, polycarbonate, and the like. The cover 102 may also be coated with one or more optical or mechanical enhancing materials or surface treatments. For example, interior and/or exterior surface of the cover 102 may be coated with an anti-reflective (AR), oleophobic or other coating to enhance the visible or functional properties of the display 101. The cover 102 may also extend over the bezel 104 and form a protective layer over substantially the entire front surface of the device 100.

In some embodiments, the device includes a touch sensor that is configured to detect the occurrence and/or the location of one or more touches on the surface of the device. In the present embodiment, the touch sensor is incorporated with the display 101 of the device to form a touch-sensitive display or touch screen display. In some embodiments, the touch sensor is a capacitive touch sensor that is configured to detect the touch of an object, such as the user's finger, on the surface of the cover. As mentioned previously, the touch sensor may include a self-capacitive and/or a mutual-capacitive sensing scheme.

Figure 2:
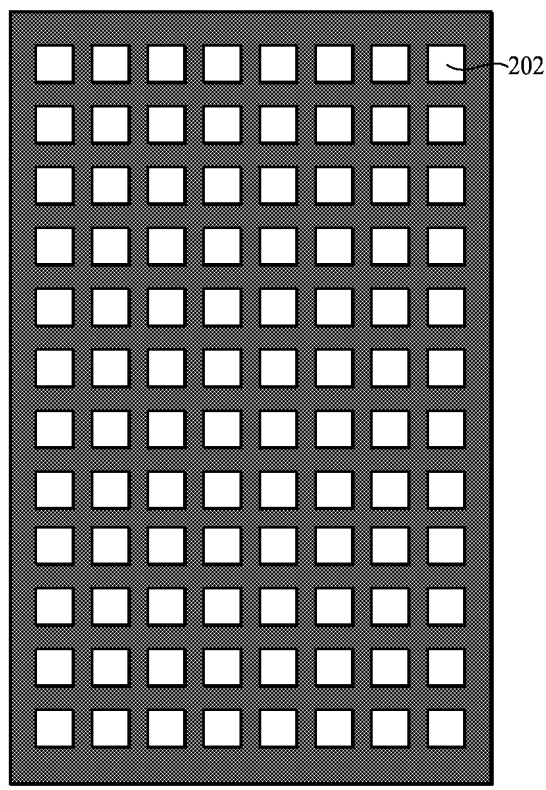
FIG. 2 depicts an example single layer electrode array.

FIG. 2 depicts an example electrode configuration for a sensor layer. In some implementation, a single-layer sensor similar to sensor layer 200 may be used for a self-capacitive touch sensor. Also, the sensor layer 200 may be used to form one layer of a capacitive force sensor in accordance with some embodiments. As shown in FIG. 2, the sensor layer 200 may include a two-dimensional array or pattern of electrodes 202. In some implementations, the electrodes are formed from a transparent conductive material, including, for example indium tin oxide (ITO), metallic nanowire, graphene, or other conductive materials or films. In some implementations, the electrodes 202 are formed from a single layer of material that has been selectively treated to form conductive regions within the layer. In some implementations, the electrode 202 may be formed from a non-transparent material. While the electrodes 202 are depicted as having a rectilinear shape, the electrodes may be formed from a variety of shapes and geometries.

In some embodiments, each electrode 202 may be electrically connected to drive and sense circuitry by a conductive line or trace. The conductive lines may be integrated into the electrode layer and may be located between the electrodes 202. Alternatively, the electrodes 202 may be electrically connected using a separate layer that is positioned above or below the sensor layer 200 depicted in FIG. 2. In some embodiments, the electrodes 202 may be individually connected using a dedicated conductive line or trace. In some embodiments, the electrodes 202 are connected in series to the drive and sense circuitry.

In some embodiments, the sensor layer 200 may be configured to operate as a self-capacitive sensor. For example, the sensor layer 200 may be operatively coupled to sensing circuitry that is configured to detect the change in electrical charge or capacitance of each electrode 202 due to the presence of a conductive object, such as a finger, touching or nearly touching the surface of the device. In some embodiments, the sensing circuitry is configured to detect which electrode or electrodes are affected by the touch and, therefore, may be able to estimate a location of the touch on the surface of the device.

As previously discussed, the electrodes 202 of the sensor layer 200 may be shared with the electrodes of a display. For example, the electrodes 202 may also form the drive electrodes of a thin film transistor (TFT) display, also referred to as a VCOM layer. The electrodes 202 may also form the drive electrodes of an OLED, LED, OEL, or other type of display element. In some implementations, the operation of the touch sensor and the operation of the display may be offset in time according to a specified time sequence. In some implementations, the operation of the touch sensor does not overlap with the operation of the display, which may prevent sensor drive signals from interfering with the operation of the display and to prevent display drive signals from interfering with the operation of the touch sensor. Example timing sequences are described below with respect to FIG. 7.

Figure 3:
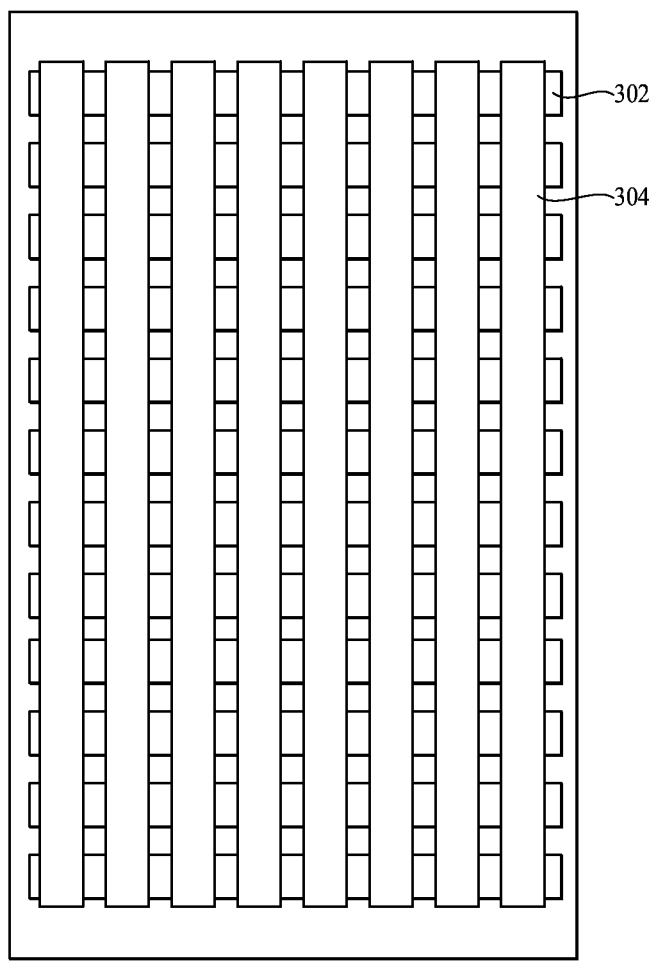
FIG. 3 depicts an example two-layer electrode array.

FIG. 3 depicts an example two-layer electrode configuration. In some implementations, the sensor 300 may be used for either a self-capacitive touch sensor or a mutually capacitive touch sensor. As shown in FIG. 3, the sensor 300 may be formed from two layers of electrodes: a first layer of row electrode 202 arranged along a first direction, and a second layer of column electrodes 204 arranged along a second direction. The two layers may be formed from a transparent conductive material similar to the examples provided above with respect to FIG. 2. The electrode layers may be separated by a dielectric substrate or a gap. In some cases, the electrode layers are disposed on either side of a transparent dielectric substrate, including, for example a glass sheet, acrylic sheet, polyethylene terephthalate (PET) film, and so on.

In some implementations, the sensor 300 may be configured to operate in accordance with a self-capacitance sensing scheme. Similar to as discussed above with respect to FIG. 2, the sensor 300 of FIG. 3 may be operatively coupled to sensing circuitry that is configured to detect the change in electrical charge or capacitance on each row and column electrode 302, 304 due to the presence of a conductive object, such as a finger, touching or nearly touching the surface of the device. In some embodiments, the sensing circuitry is configured to detect which row electrode or electrodes are affected by the touch and, therefore, may be able to estimate a first coordinate of the location of the touch on the surface of the device. Similarly, by detecting which column electrode or electrodes are affected by the touch, the sensing circuitry may be able to estimate a second coordinate of the location of the touch.

Additionally or alternatively, the sensor 300 may be operated in accordance with a mutually capacitive sensing scheme. For example, in some implementations, the row electrodes 302 may be configured as drive electrodes that are operatively coupled to drive circuitry that produces an alternating or time varying drive signal. The column electrodes 304 may be configured as sense electrodes that are operatively coupled to sensing circuitry that is configured to detect changes in charge coupling or capacitive coupling at the intersection of the row electrodes 302 and the column electrodes 304. Changes in the charge or capacitive coupling between an intersecting pair of row 302 and column 304 electrodes may be used to detect the touch or near touch of an object on the surface of the device.

Additionally, as described previously, the electrodes 302, 304 of the sensor 300 may also be used as one or more electrodes of a display element. For example, the row electrodes 302 and/or the column electrodes 304 may be used as the drive electrodes for a TFT-LCD, OLED display, LED display, OEL display, or other type of display element. Thus, as discussed above, the electrodes 302, 304 may be used as sensor electrodes during a time interval that does not overlap with their use as display drive electrodes.

Figure 4:
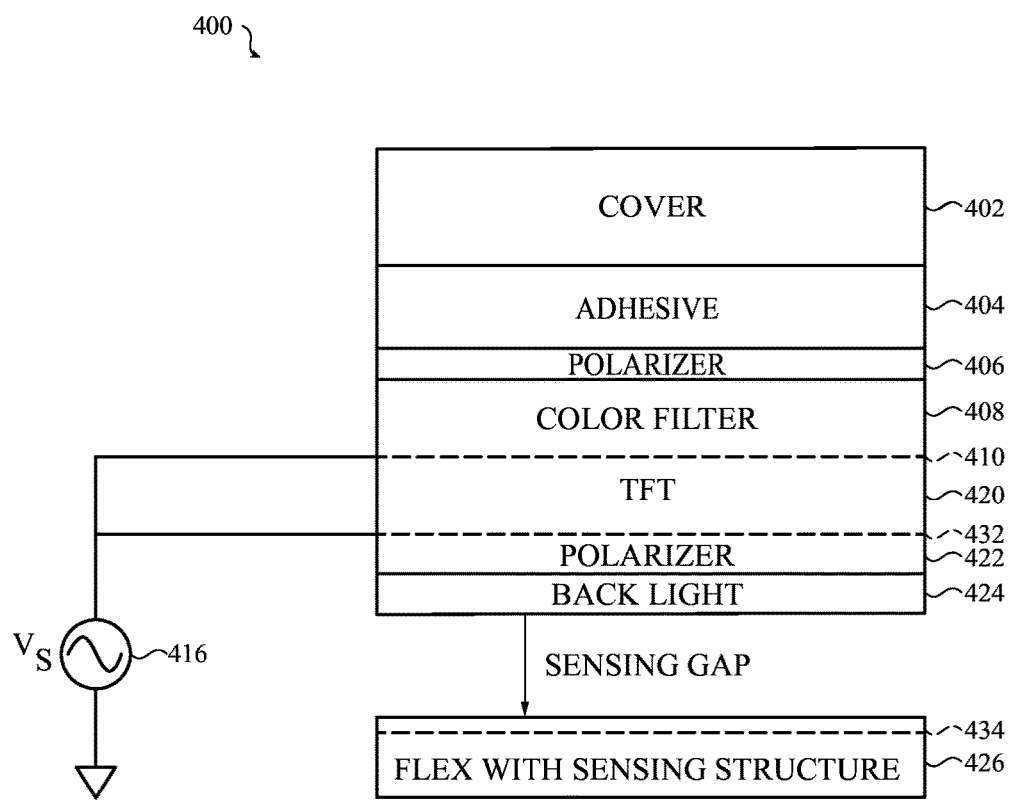
FIG. 4 depicts an example display stack including a self-capacitive touch sensor and force sensor.

As previously described, the touch sensor may also be incorporated or integrated with a force sensor for detecting the force of a touch on the surface of the device. FIG. 4 depicts an example display stack 400 including a self-capacitive touch sensor and force sensor. The display stack 400 may be incorporated into the display of, for example, the device 100 depicted in FIG. 1. The example depicted in FIG. 4 includes a TFT-LCD type display element. However, a similar sensor configuration may be integrated with other types of display devices, including, for example, an OLED display, LED display, OEL, display, or other type of display element or device.

As shown in FIG. 4, the stack 400 includes a force sensor formed from a drive electrode layer 432 separated by a gap 436 from sense electrode layer 434. In some embodiments, the drive electrode layer 432 and/or the sense electrode layer 434 may include an array or pattern of electrodes. The electrode array or pattern may include a pixelated pattern similar to the electrode configuration depicted in FIG. 2. The electrode array or pattern may also include a row and column pattern similar to the electrode configuration depicted in FIG. 3.

In some implementations, the force sensor may be configured to detect the force of a touch on the cover 402, which may cause the display stack to deflect or flex and reduce distance between the drive electrode layer 432 and sense electrode layer 434 of the force sensor. The change in distance may be detected, for example, by detecting a change in capacitance between the drive electrode layer 432 and sense electrode layer 434 using sensing circuitry operatively coupled to the two layers. In the present example, the gap 436 allows the drive electrode layer 432 to deflect with respect to the sense electrode layer 434. In some embodiments, the gap 436 includes air, a compressible medium or layer of material or a combination of air and a compressible medium.

As shown in FIG. 4, the drive electrode layer 432 of the force sensor is disposed below a touch-sensor layer 410. In some implementations, the drive electrode layer 432 may function as an electrical shield for the touch-sensor layer 410 and help to isolate the touch-sensor layer 410 from electrical interference from other elements of the device. In some implementations, the drive electrode layer 432 may substantially shield the touch-sensor layer 410 from the signals generated by the force sensor between the drive electrode layer 432 and the sense electrode layer 434. In some embodiments, the drive electrode layer 432 may substantially shield the touch-sensor layer 410 from electrical interference produced by component located below the drive electrode layer 432 (including electrical interference produced by the operation of the force sensor). In some embodiments, the drive electrode layer 432 includes a single drive electrode having an area that is approximately the same as the area of the touch-sensor layer 432. Alternatively, the drive electrode layer 432 includes an array of drive electrodes having a combined area that is approximately the same as the area of the touch-sensor layer 432.

In some implementations, the drive electrode layer 432 may help to isolate the touch-sensor layer 410 from the effects of deflection in the stack 400. For example, without the drive electrode layer 432, the touch-sensor layer 410 may capacitively couple with other conductive elements located below the stack 400. The incidental capacitive coupling with other components may vary when the stack 400 is deflected, which may impair the reliability or operability of the touch-sensor layer 410. However, using the configuration depicted in FIG. 4, the touch-sensor layer 410 may capacitively couple with the drive electrode layer 432 to a much greater degree than other elements located below the stack 400. Because the capacitance between the touch-sensor layer 410 and the drive electrode layer 432 may remain fixed or predictable when the stack 400 is deflected, the touch-sensor layer 410 may remain substantially unaffected by the deflection.

The shielding and deflection-isolation properties of the drive electrode layer 432 may be enabled or improved by using a common drive for both the touch sensor and force sensor. As shown in FIG. 4, a common source 416 is used to drive both the drive electrode layer 432 and the touch-sensor layer 410. In the present example, and as described in more detail below with respect to FIG. 6, the touch sensor and force sensor share a common drive, but may each have separate sense circuitry.

The touch sensor of the present example is configured to operate in accordance with a self-capacitance sensing scheme. The touch-sensor layer 310 may include an array of electrodes similar to as described above with respect to FIG. 2. Also, in the present example, the touch sensor is integrated with the display as an in-cell sensor. In particular, the touch-sensor layer 410, which may include an array of pixel elements, also functions as the drive or VCOM layer for the TFT-LCD element 420 disposed below the touch-sensor layer 310.

As shown in FIG. 4, the touch-sensor layer 410 and force sensor electrode layers 432, 434 are incorporated into a stack 400 that includes various other elements that may facilitate optical or mechanical aspects of the stack. In particular, the stack 400 includes a cover 402, which may be formed from a glass, sapphire, acrylic, polycarbonate, or other sheet of transparent material. As described above with respect to FIG. 1, the cover 402 may protect the display and other elements of the device. The cover 402 also receives the touch input that is detected by the touch sensor and force sensor of the present embodiment.

As shown in FIG. 4 a polarizer layer 406 and a color filter layer 408 may be disposed below the cover 402 and attached to the cover 402 by an adhesive layer 404. The adhesive layer 404 may include an optically clear pressure-sensitive adhesive. As shown in FIG. 4, the touch sensitive layer 410 and LCD-TFT display layer 420 are also disposed below the cover 402. In this example, a polarizer layer 422 and a back-light unit 424 are disposed below the LCD-TFT display layer 420. In the present embodiment, a flex substrate 426, which includes the (force) sense electrode layer 434 is separate from the back-light unit 424 by the gap 436.

While FIG. 4 depicts a particular example embodiment, the specific layers and the relative placement of the layers may vary depending on the implementation. For example, in the present embodiment, the force sensor, including the drive electrode layer 432 is disposed below the TFT-LCD layer 420 and above the polarizer layer 422 and back-light unit 424. However, in other embodiments, the drive electrode layer 432 may be located below the back-light unit 424 or below another layer in the stack not expressly depicted in the stack 400.

Figure 5:
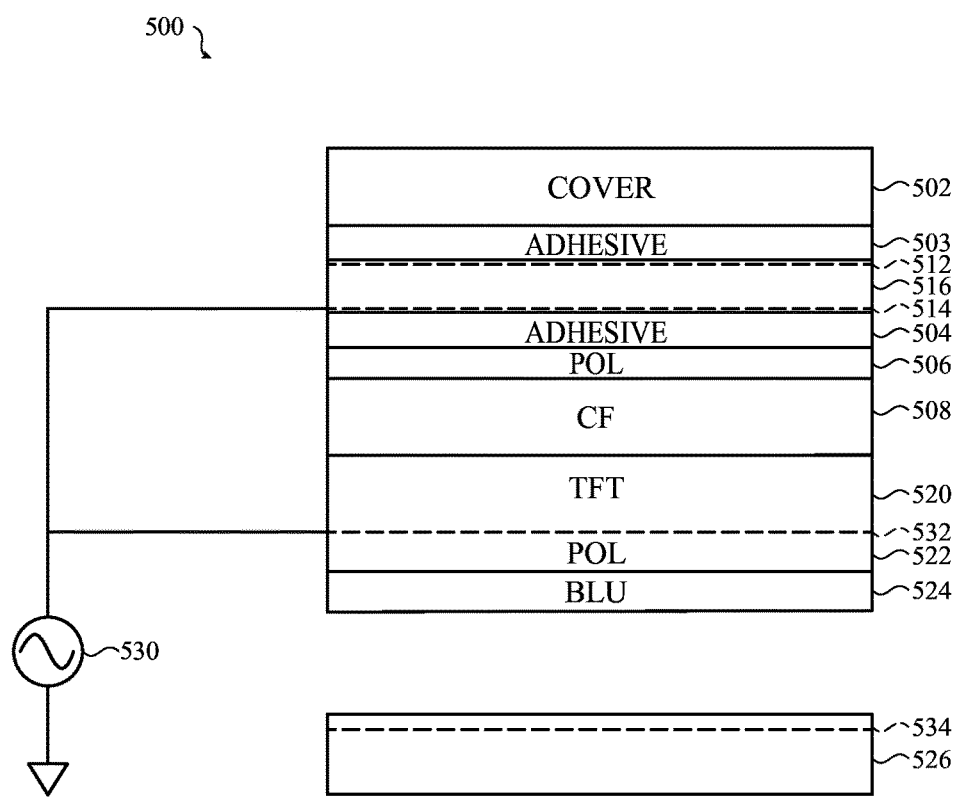
FIG. 5 depicts an example display stack including a two-layer touch sensor and force sensor.

The sensing configuration described with respect to FIG. 4 may also be implemented using a two-layer touch sensor structure. FIG. 5 depicts a sensor stack 500 having a first touch-sensor layer 512 and a second touch-sensor layer 514. The two-layer structure may correspond to the row and column electrode structure described above with respect to FIG. 3. In particular, the first touch-sensor layer 512 may include an array of row electrodes arranged along a first direction and the second-touch sensor layer 514 may include an array of column electrodes arranged along a second direction. As shown in FIG. 5, the first touch-sensor layer 512 may be separated by the second touch-sensitive layer 514 by a substrate 516. The first and second touch-sensor layers 512, 514 may be formed from a transparent conductive material that is formed on or otherwise fixed relative to the surface of the substrate 516.

In the present example, the touch sensor is a separate sensor having dedicated electrodes, in contrast to the in-cell sensor described above with respect to FIG. 4. As shown in FIG. 5, the first and second touch-sensor layers 512, 514 are disposed below the cover 502 and attached to the cover 502 by adhesive layer 503. The polarizer 506, the color filter 508 and the TFT-LCD layer 520 are disposed below the touch-sensor layers 512, 514 and are attached by adhesive layer 504. As shown in FIG. 5, the polarizer layer 522 and the back-light unit 524 are disposed below the drive electrode layer 532. However, in other embodiments, the arrangement and specific layer of the stack 500 may vary. In particular, the in other embodiments, the drive electrode layer 532 may be disposed below the polarizer layer 522 and the back-light unit 524.

Similar to the previous example, the drive electrode layer 532 of the force sensor is disposed below the TFT-LCD layer 520. Also, the sense electrode layer 534 is disposed below the drive electrode layer 532 and separated from the drive electrode layer 532 by the gap 536. The operation of force sensor depicted in FIG. 5 is substantially similar to as described above with respect to FIG. 4.

Also, similar to the previous example, as shown in FIG. 5 a common source 530 is used to drive both the drive electrode layer 532 and the touch sensor (e.g., second touch-sensor layer 514). In the present example, the touch sensor and force sensor share a common drive, but may each have separate sense circuitry. Also, as described above with respect to FIG. 4, using a common source 530 may enable or improve the shielding and isolation properties of the drive electrode layer 532, which may improve the operability and/or reliability of the touch sensor.

Figure 6:
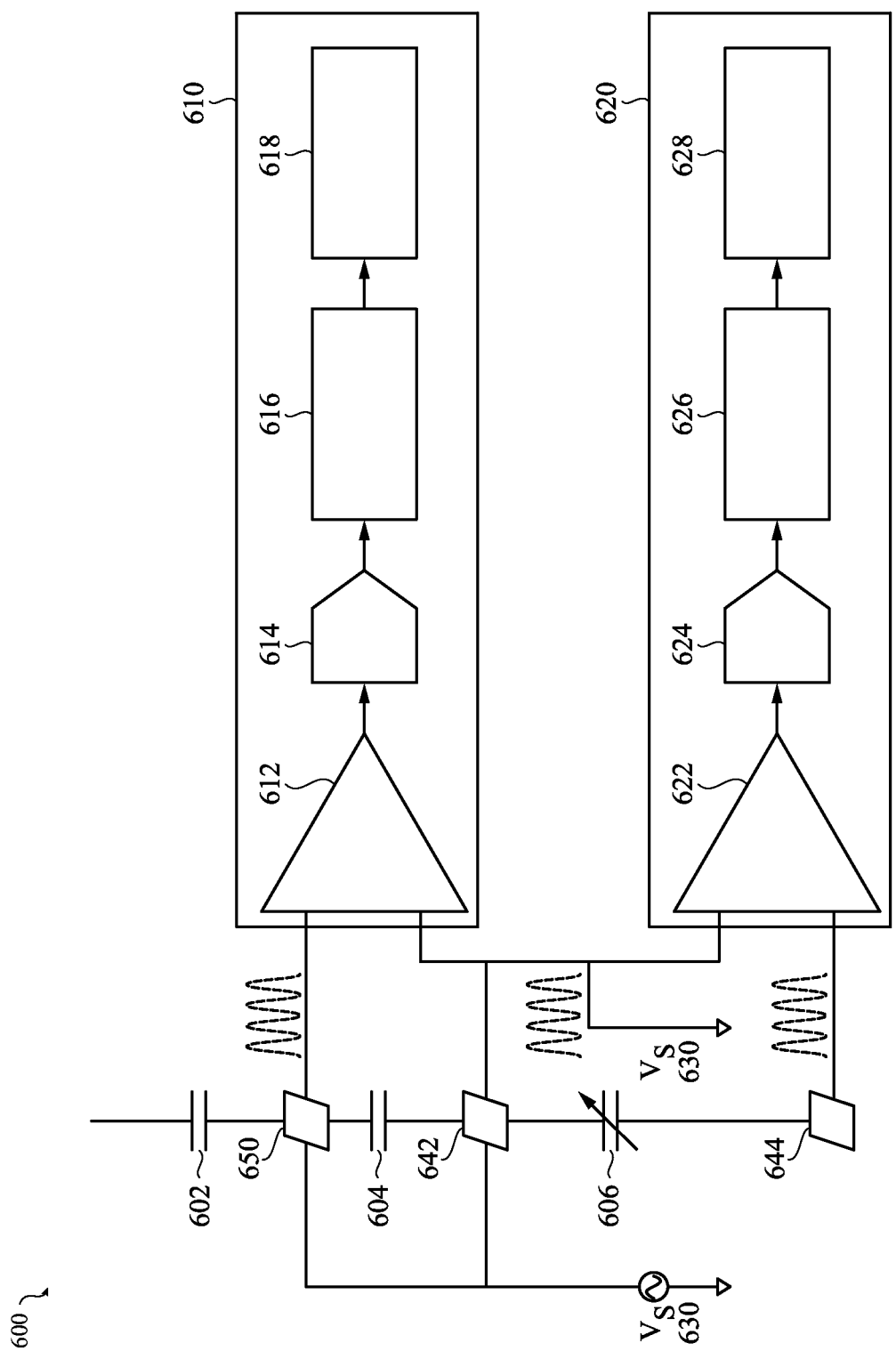
FIG. 6 depicts an example schematic diagram for an integrated touch sensor and force sensor.

FIG. 6 depicts an example schematic diagram for an integrated touch sensor and force sensor. The example sensing system 600 of FIG. 6 integrates both a touch sensor and force sensor in the same device. In the simplified schematic of FIG. 6, the touch sensor may include touch electrodes 650 and touch-sensing circuitry 610. The touch electrodes 650 may include an electrode layer having an array of electrodes in accordance with the example provided above with respect to FIG. 2. Similarly, the force sensor may include force electrodes 642 and 644 and force-sensing circuitry 620. The example sensing system 600 may be used to operate the sensing configuration described above with respect to stack 400 of FIG. 4. The system 600 is on illustrative example and the specific architecture may vary depending on the type of touch sensor that is used (self-capacitive, mutual-capacitive) and other design considerations.

As shown in FIG. 6, the touch electrodes 650 and the force electrodes 642 are both driven by a common source 630. For example, the common source 630 may be configured to generate an alternating or time varying voltage signal that is used as the drive signal for both sensors. The drive signal may include an electric pulse, a series of electric pulses, and or an alternating electrical signal.

As shown in FIG. 6, the touch electrodes 650 may be subjected to a capacitance 602 created by an object, such as a finger, touching or nearly touching the surface of the device. In general, the touch-sensing circuitry 610 is configured to detect the capacitance 602 and produce an output indicating the occurrence and/or location of the touch on the device. As shown in FIG. 6, the touch electrodes 650 may also be subjected to capacitance 604 between the force electrodes 642 and the touch electrodes 650. In some implementations, the capacitive coupling between the touch electrodes 650 and the force electrodes 642 may help to isolate the touch sensor from other elements in the device and may also reduce the effects of display stack deflection or other sources of capacitive-based interference.

As shown in FIG. 6, the force sensor includes (drive) force electrodes 642 that capacitively couple with (sense) force electrodes 644 via variable capacitance 606. In some embodiments, the distance between the force electrodes 642 and 644 may change due to a force applied to the surface of the device. The change in distance may result in a change in capacitance 606, which may be detected and monitored by the force-sensing circuitry 620. In some implementations, the change in capacitance 606 may correspond to the force on the device based on a predetermined relationship or correlation. Thus, the force-sensing circuitry may be configured to estimate the force that is applied to the device using the capacitance 606.

As shown in FIG. 6, the touch and force sensors use separate sensing circuits 610, 620. However, as shown in FIG. 6, the basic architecture of the sensing circuits is similar, which may simplify some hardware implementations. In particular, the touch-sensing circuitry 610 includes a charge amplifier 612 that is operatively coupled to the touch electrodes 650 and a voltage reference, which in this case is the source 630. The charge amplifier 612 may be configured to accumulate current/charge produced using the touch electrodes 650 and produce an output voltage. The charge amplifier 612 may be specially configured to detect small changes in current/charge due to the presence of an object, such as a finger, touching the touch-sensitive surface of the device. As shown in FIG. 6, an analog to digital converter (ADC) 614 is operatively coupled to the output of the charge amplifier 612 and is configured to convert the output voltage to a digital signal. A charge integration unit 616 may receive the digital signal and integrate multiple signals over a period of time. The output of the charge integration unit 616 may be sent to processing unit 618, which may be configured to correlate the integrated signal with a map or set of known values and produce an estimated capacitance or other electrical measurement value.

The force-sensing circuitry 620 may include a similar architecture. As shown in FIG. 6, the touch-sensing circuitry 620 includes a charge amplifier 622 that is operatively coupled to the (sense) force electrodes 644 and a voltage reference, which in this case is the source 630. The charge amplifier 622 may be configured to accumulate current/charge produced using the (sense) force electrodes 644 and produce an output voltage. The charge amplifier 622 may be specially configured to detect small changes in current/charge due to the deflection between the force electrodes 642, 644 caused by a force applied to the device. As shown in FIG. 6, an analog to digital converter (ADC) 624 is operatively coupled to the output of the charge amplifier 622 and is configured to convert the output voltage to a digital signal. A charge integration unit 626 may receive the digital signal and integrate multiple signals over a period of time. The output of the charge integration unit 626 may be sent to processing unit 628, which may be configured to correlate the integrated signal with a map or set of known values and produce an estimated capacitance or other electrical measurement value.

The system 600 may include additional elements not depicted in FIG. 6. For example, the system 600 may also include components for multiplexing drive signals that are sent to the (drive) force electrodes 642 and/or the touch electrodes 650. Similarly, the system 600 may include components for multiplexing sensor signals received from the touch electrodes 650 and/or the (sense) force electrodes 644. Additional switching circuitry and/or signal processing circuitry may also be included in system 600.

The output of both the touch-sensing circuitry 610 and the force-sensing circuitry 620 may be used to determine the occurrence, location, and force of one or more touches on a surface of the device. In some implementations, the output from the touch and force sensor is used to provide user input to a graphical user interface presented on the display of the device. In some cases, the touch and force sensing is performed at a rate that is sufficient to control a cursor or other element presented on the display.

Additionally, as discussed previously, the operation of the touch sensor may be coordinated with the operation of the display. In particular, if the touch sensor includes an in-cell configuration that shares electrodes with the display, the operation of the touch sensor may not overlap with the operation of the display to avoid interference between the two. In some cases, the operation of the display also interferes with the operation of the force sensor. Thus, performing both touch sensing, force sensing, and operating the display may present unique challenges.

Figure 7:
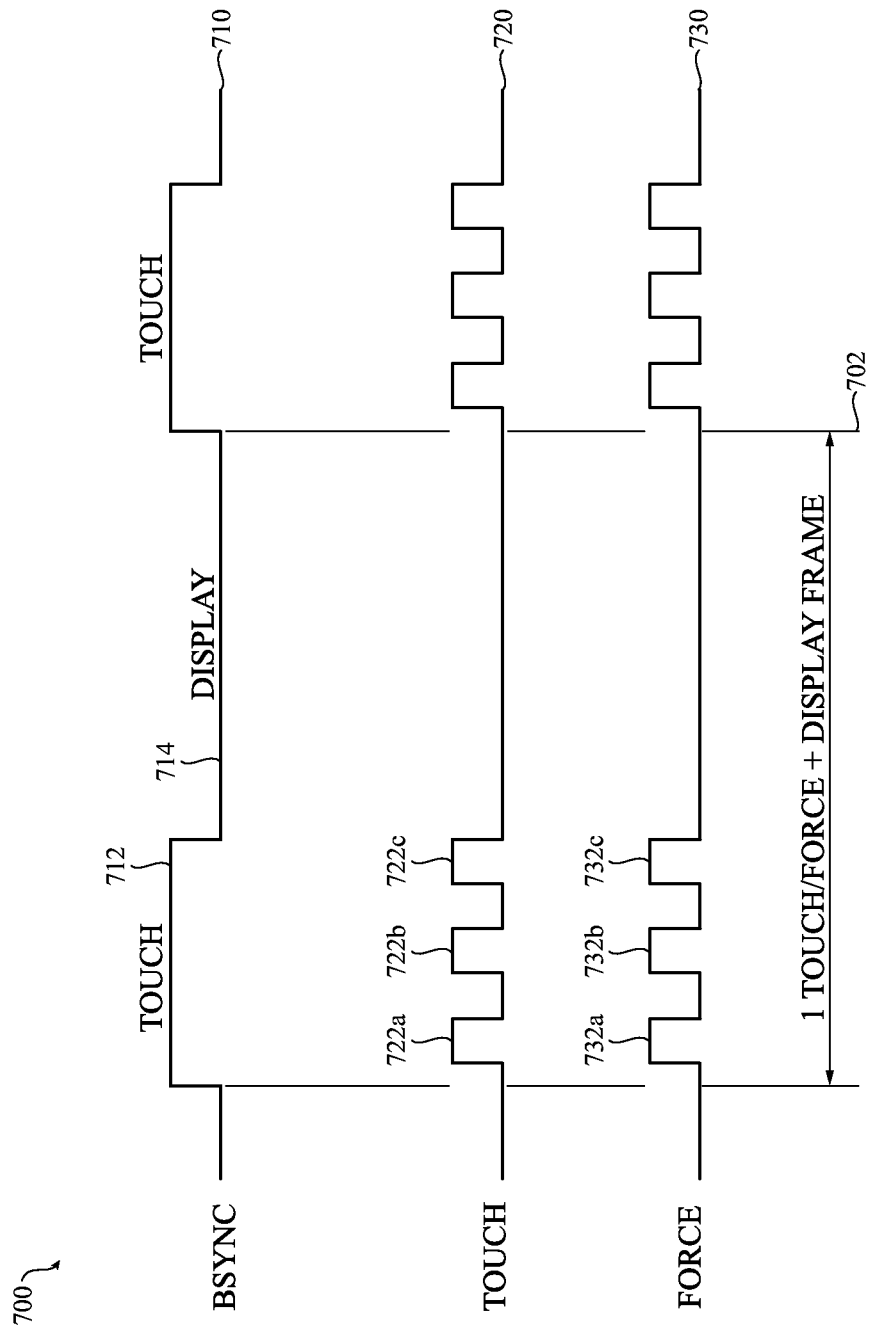
FIG. 7 depicts an example timing diagram for operating a touch sensor and force sensor integrated with a display.

One solution is to perform touch and force sensing over the same time interval, which may allow more time for operation of the display. By performing force sensing over the same interval as touch sensing, interference from the display operations may be reduced or eliminated. FIG. 7 depicts an example timing diagram for operating a touch sensor and force sensor integrated with a display. As shown in FIG. 7, the touch sensor, force sensor, and display may be operated according to sequence 710. The timing sequence 710 includes a first, sensing interval 712 in which the touch sensor may be operated and a second, display interval 714 in which the display may be operated. In the embodiment represented in FIG. 7 the operation of the touch sensor and the display do not overlap.

The total time to perform both the sensing interval 712 and the display interval 714 is indicated by the cycle period 702. The cycle period 702 may be dictated by the refresh rate of the display. In general, a shorter cycle period 702 may result in a higher performance display. For example, a shorter cycle period 702 may result in a display that can present more display frames per second, which may be an important criteria for displaying video or moving graphical elements.

Timing sequence 720 represents the operation of an example touch sensor. As shown in FIG. 7, the touch sensor may perform multiple poling operations or sensing measurements over sensing periods 722a, 722b, 722c, which are performed during the touch interval 712. During each touch-sensing period, a drive signal may be produced and a sensor response may be measured. In some implementations, a series of voltage pulses are produced over a sensing period (722a, 722b, 722c) and transmitted to the touch electrode(s). The electrical response of the touch electrode(s) may then be measured using sensing circuitry similar to the example provided above with respect to FIG. 6. In some implementations, an entire scan of a touch-sensor electrode array is performed over each of the sensing period (722a, 722b, 722c).

Timing sequence 730 represents the operation of an example force sensor. The operation of the force sensor may also occur over the sensing interval 712. In particular, the force sensor may perform multiple poling or sensing measurements 732a, 732b, 732c, which are performed during the touch interval 712. During each force-sensing period, a drive signal may be produced and a sensor response may be measured. In some implementations, a series of voltage pulses are produced over a force-sensing period (722a, 722b, 722c) and transmitted to the touch electrode(s). The electrical response of the force electrode(s) may then be measured using sensing circuitry similar to the example provided above with respect to FIG. 6. In some implementations, an entire scan of a force-sensor electrode array is performed over each of the sensing period (732a, 732b, 732c).

In some implementations, the touch-sensing periods (722a, 722b, 722c) are performed in tandem with the force-sensing periods (732a, 732b, 732c). For example, a single drive signal may be produced and transmitted to both the sense and force electrode(s) at substantially the same time. Alternatively, in some implementations, the touch-sensing periods (722a, 722b, 722c) and the force-sensing periods (732a, 732b, 732c) are both performed over the sensing interval 712, but are not necessarily both performed at precisely the same time. For example, the touch-sensing periods (722a, 722b, 722c) may be offset in time with respect to the force-sensing periods (732a, 732b, 732c), but both sets of sensing periods are performed during the sensing interval 712.

Figure 8:
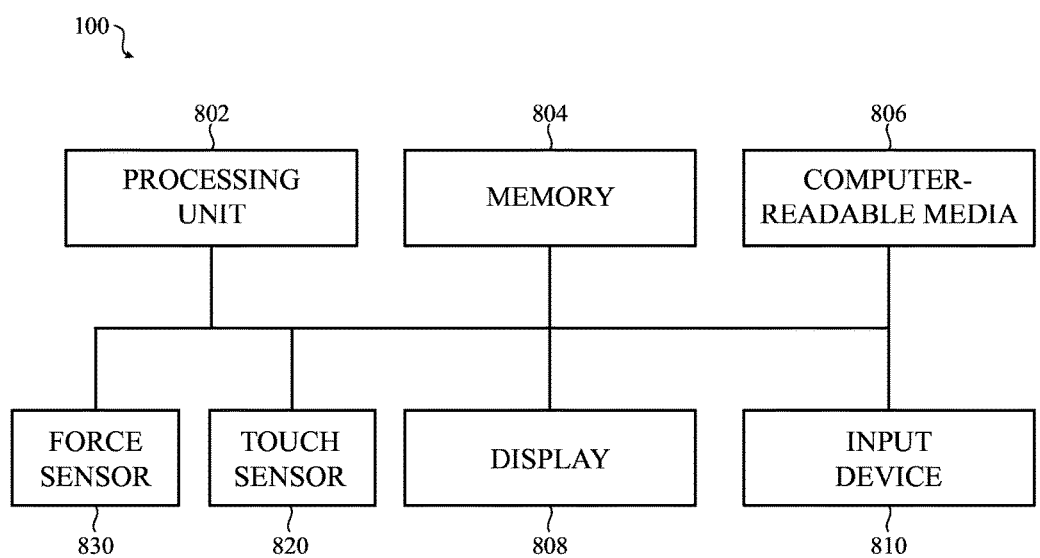
FIG. 8 depicts components of an example electronic device.

FIG. 8 depicts components of an example electronic device. The schematic representation depicted in FIG. 8 may correspond to components of the portable electronic devices described above, including the device 100 depicted in FIG. 1. However, FIG. 8 may also more generally represent other types of devices that are configured to use an integrated touch and force sensor.

As shown in FIG. 8, a device 100 includes a processing unit 802 operatively connected to computer memory 804 and computer-readable media 806. The processing unit 802 may be operatively connected to the memory 804 and computer-readable media 806 components via an electronic bus or bridge. The processing unit 802 may include one or more computer processors or microcontrollers that are configured to perform operations in response to computer-readable instructions. The processing unit 802 may include the central processing unit (CPU) of the device. Additionally or alternatively, the processing unit 802 may include other processors within the device including application specific integrated chips (ASIC) and other microcontroller devices.

The memory 804 may include a variety of types of non-transitory computer-readable storage media, including, for example, read access memory (RAM), read-only memory (ROM), erasable programmable memory (e.g., EPROM and EEPROM), or flash memory. The memory 804 is configured to store computer-readable instructions, sensor values, and other persistent software elements. Computer-readable media 806 also includes a variety of types of non-transitory computer-readable storage media including, for example, a hard-drive storage device, solid state storage device, portable magnetic storage device, or other similar device. The computer-readable media 806 may also be configured to store computer-readable instructions, sensor values, and other persistent software elements.

In this example, the processing unit 802 is operable to read computer-readable instructions stored on the memory 804 and/or computer-readable media 806. The computer-readable instructions may adapt the processing unit 802 to direct or control the sensing and display operations described above with respect to FIG. 7. The computer-readable instructions may be provided as a computer-program product, software application, or the like.

As shown in FIG. 8, the device 100 also includes a display 808 and an input device 810. The display 808 may include a liquid-crystal display (LCD), organic light emitting diode (OLED) display, light emitting diode (LED) display, organic electroluminescence (OEL) display, or other type of display element. If the display 808 is an LCD, the display may also include a backlight component that can be controlled to provide variable levels of display brightness. If the display 808 is an OLED or LED type display, the brightness of the display may be controlled by controlling the electrical signal that is provided to display elements.

The input device 810 is configured to provide user input to the device 100. The input device 810 may represent devices that are configured to provide user input in addition to the touch sensor 820 and force sensor 830 of the device 100, which may also be generally characterized as input devices. The input device 810 may include, for example, touch button, keyboard, key pad, or other touch input device. The device 100 may include other input devices, including, for example, power button, volume buttons, home buttons, scroll wheels, and camera buttons.

As shown in FIG. 8, the device 100 also includes a touch sensor 820 that may be configured to detect the occurrence and location of a touch on the device. In accordance with some embodiments described herein, the touch sensor 820 may include a capacitive touch electrode(s) that is integrated into a display stack and configured to detect a touch on the cover (glass) of the display. Example touch sensors are described above with respect to the embodiments of FIGS. 2-6.

The device also includes a force sensor 830 that may be configured to detect and measure a force applied to a surface of the device. In accordance with some embodiments described herein, the force sensor 830 may include at least one pair of capacitive force electrodes that are configured to deflect relative to each other in response to a force applied to a surface of the device. Example force sensors are described above with respect to the embodiments of FIGS. 2-6.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

We claim:

1. A touch and force sensing device comprising:
   a cover;
   a layer of touch-sensor electrodes disposed below the cover, the layer of touch-sensor electrodes being configured to sense a touch on the cover;
   a force-sensor drive electrode layer disposed below the cover;
   a force-sensor sense electrode layer disposed below the cover, wherein the force-sensor drive electrode layer and the force-sensor sense electrode layer are configured to sense a force on the cover; and
   a shared voltage source operatively coupled to the layer of touch-sensor electrodes and the force-sensor drive electrode layer and operative to contemporaneously drive at least one touch-sensor electrode of the layer of touch-sensor electrodes with at least one force-sensor drive electrode of the force-sensor drive electrode layer.

2. The device of claim 1, wherein the force-sensor drive electrode layer comprises a single electrode having an area that is approximately the same as an area of the layer of touch-sensor electrodes.

3. The device of claim 1, wherein the force-sensor sense electrode layer is disposed below the force: sensor drive electrode layer.

4. The device of claim 1, wherein the force-sensor drive electrode layer substantially shields the touch-sensor electrodes from electrical interference produced by components located below the force-sensor drive electrode layer.

5. The device of claim 1, wherein:
   the force-sensor drive electrode layer comprises an array of drive electrodes, the array of drive electrodes having an area that is approximately the same as an area of the layer of touch-sensor electrodes; and
   the array of drive electrodes substantially shields the layer of touch-sensor electrodes from electrical interference produced by components located below the force-sensor drive electrode.

6. The device of claim 1, wherein the layer of touch-sensor electrodes are disposed over a display element, and the layer of touch-sensor electrodes are used to drive the display element.

7. The device of claim 1, wherein the layer of touch-sensor electrodes form a Vcom layer of a thin-film transistor (TFT) liquid crystal display (LCD) element.

8. The device of claim 1, further comprising an array of sense electrodes operatively coupled to touch-sensing circuitry that is configured to detect changes in charge coupling between one or more electrodes of the array of sense electrodes and one or more electrodes of the layer of touch-sensor electrodes.

9. The device of claim 1, wherein the layer of touch-sensor electrodes comprises an array of touch-sensor electrodes.

10. An electronic device comprising:
a housing;
a display disposed within an opening of the housing;
a cover disposed over the display;
an array of touch-sensor electrodes disposed below the cover, the array of touch-sensor electrodes being configured to sense a touch on the cover;
a force-sensor drive electrode disposed in a first layer below the cover;
a force-sensor sense electrode disposed in a second layer, wherein the force-sensor drive electrode and force-sensor sense electrode are configured to sense a force on the cover; and
a shared voltage source operatively coupled to the array of touch-sensor electrodes and the force-sensor drive electrode and operative to contemporaneously drive at least one touch-sensor electrode of the array of touch-sensor electrodes with the force-sensor drive electrode.

11. The electronic device of claim 10, further comprising:
a polarizer layer disposed below the display; and
a back-light unit disposed below the polarizer layer, wherein
the force-sensor drive electrode is disposed between the display and the polarizer layer.

12. The electronic device of claim 10, wherein:
the force-sensor drive electrode and the force-sensor sense electrode are separated by a gap;
a force on the cover causes the gap to decrease; and
the force-sensor sense electrode is operatively coupled to force-sensing circuitry that is configured to detect changes in capacitance between the force-sensor drive electrode and the force-sensor sense electrode due to the decrease in the gap.

13. The electronic device of claim 12, wherein the gap includes one or more of: air, a compressible medium, or a combination of air and a compressible medium.

14. The electronic device of claim 10, wherein the array of touch-sensor electrodes are disposed over the display.

15. The electronic device of claim 10, wherein the second layer is disposed below the first layer of the force-sensor drive electrode.

16. A method of performing touch and force sensing on a cover of a device, the method comprising:
transmitting a drive signal to an array of touch-sensor electrodes using a common voltage source, the array of touch-sensor electrodes being disposed below the cover;
transmitting the drive signal to a force-sensor drive electrode using the common voltage source;
sensing a response from both the array of touch-sensor electrodes and a force-sensor sense electrode contemporaneously;
determining if an object is touching the cover based on the sensed response from the array of touch sensor electrodes;
and
determining a force associated with the object touching the cover based on the sensed response from the force-sensor sense electrode.

17. The method of claim 16, wherein the transmitting the drive signal to the array of touch-sensor electrodes and the transmitting the drive signal to the force-sensor drive electrode is performed at substantially the same time.

18. The method of claim 16, further comprising:
transmitting a display drive signal to a display element of the device, wherein the transmitting the display drive signal is performed at a separate time than the transmitting the drive signal to the array of touch-sensor electrodes and the transmitting the drive signal to the force-sensor drive electrode.

19. The method of claim 16, wherein the force-sensor drive electrode is disposed above the force-sensor sense electrode.

20. The method of claim 16, wherein the force-sensor sense electrode is disposed in a layer below the force-sensor drive electrode.

* * * * *